US012446808B2

(12) United States Patent
Li et al.

(10) Patent No.: US 12,446,808 B2
(45) Date of Patent: Oct. 21, 2025

(54) FLUID OSMOLARITY SENSING AND ASSOCIATED SYSTEMS, DEVICES, AND METHODS

(71) Applicant: Verily Life Sciences LLC, Dallas, TX (US)

(72) Inventors: Zidong Li, South San Francisco, CA (US); Shungneng Lee, South San Francisco, CA (US)

(73) Assignee: Verily Life Sciences LLC, Dallas, TX (US)

( * ) Notice: Subject to any disclaimer, the term of this patent is extended or adjusted under 35 U.S.C. 154(b) by 455 days.

(21) Appl. No.: 17/973,110

(22) Filed: Oct. 25, 2022

(65) Prior Publication Data

US 2023/0127885 A1    Apr. 27, 2023

Related U.S. Application Data

(60) Provisional application No. 63/271,507, filed on Oct. 25, 2021.

(51) Int. Cl.
*A61B 5/1477* (2006.01)
*A61B 3/10* (2006.01)
*A61B 5/00* (2006.01)

(52) U.S. Cl.
CPC ............ *A61B 5/1477* (2013.01); *A61B 3/101* (2013.01); *A61B 5/4266* (2013.01)

(58) Field of Classification Search
CPC ..... A61B 3/101; A61B 5/1477; A61B 5/4266; A61B 10/0064; A61B 5/002; A61B 5/14507; A61B 5/4836; A61B 5/4875; A61B 5/6821; A61N 1/36046; B32B 23/08; B32B 2305/55; B32B 2307/42;
(Continued)

(56) References Cited

U.S. PATENT DOCUMENTS

2004/0166140 A1 * 8/2004 Santini, Jr. ........... A61K 9/0024
424/424
2015/0173658 A1    6/2015 Liu et al.
(Continued)

FOREIGN PATENT DOCUMENTS

EP        3263175 A1    1/2018

OTHER PUBLICATIONS

International Searching Authority of the European Patent Office, International Search Report and Written Opinion of the International Searching Authority for PCT/US2022/047337, Feb. 3, 2023, 9 pages.

*Primary Examiner* — Eric J Messersmith
(74) *Attorney, Agent, or Firm* — Haynes and Boone, LLP

(57) ABSTRACT a substrate configured to be positioned in the presence of a fluid; a first electrode comprising a conductive film disposed on the substrate; and a second electrode comprising the conductive film disposed on the substrate and spaced from the first electrode. The device may further include a current measurement circuit configured to: apply a voltage between the first electrode and the second electrode, wherein the voltage is in an electrochemical active range of the conductive film such that a portion of the conductive film dissolves into the fluid; and transmit, to a processor, a signal indicating a current measurement of an electrical current flowing through the fluid including the dissolved portion of the conductive film.

26 Claims, 8 Drawing Sheets

(58) Field of Classification Search
CPC . B32B 2307/51; B32B 2457/20; B32B 7/023;
B32B 7/06; B32B 7/12; G02B 5/30;
G02B 5/3016; H10K 59/80
See application file for complete search history.

(56) References Cited

U.S. PATENT DOCUMENTS

| | | | | |
|---|---|---|---|---|
| 2017/0354374 | A1* | 12/2017 | Pepin | G08B 21/20 |
| 2019/0380871 | A1* | 12/2019 | Gutierrez | A61F 9/0017 |
| 2020/0214886 | A1* | 7/2020 | Gutierrez | A61N 1/325 |
| 2020/0214887 | A1* | 7/2020 | Gutierrez | A61K 9/0009 |

\* cited by examiner

FLUID OSMOLARITY SENSING AND ASSOCIATED SYSTEMS, DEVICES, AND METHODS

CROSS-REFERENCE TO RELATED APPLICATIONS

The present application claims the benefit of and priority to U.S. Provisional Patent Application No. 63/271,507, filed Oct. 25, 2021, the entirety of which is incorporated by reference herein.

TECHNICAL FIELD

The present disclosure relates generally to devices, systems, and associated methods for sensing or measuring the osmolarity of fluids. In particular but not exclusively, the present disclosure relates to devices for sensing or measuring solute concentration and/or osmolarity of body fluids, including tears and sweat.

BACKGROUND

Some health concerns and illnesses relate to the balance or concentration of electrolytes and other solutes in body fluids. For example, a high concentration of electrolytes in sweat may indicate dehydration. A high concentration of electrolytes in tear fluid may indicate that the patient has a dry eye condition. A large number of people have Dry Eye Disease ("DED"), which includes symptoms of intense pain, stinging eyes, foreign body sensation, light sensitivity, blurriness, increased risk of infection, and possible vision loss. DED is characterized by insufficient tear volume or unbalanced tear composition on the ocular surface of a patient, which is generally caused by insufficient tear production or excessive tear evaporation. Insufficient tear volume results in tear hyperosmolarity, which causes inflammation and nerve damage and can lead to progressive loss of tear production and quality.

Dry-eye symptoms vary based on a variety of factors. For example, dry-eye symptoms vary throughout a day in response to diurnal physiological variations in tear pH, intraocular pressure, corneal sensitivity, visual sensitivity, and melatonin production. For instance, corneal sensitivity is often significantly greater in the evening than compared to the morning. Longer term variations in dry-eye symptoms can be related to use of systemic medications, chronic disease (e.g., diabetes), hormonal changes, and aging. Changes to a patient's environment also contribute to dry-eye symptom variations. For example, dry-eye symptoms can increase due to low humidity of air-conditioned offices, winter heating, computer use, phone use, allergens, and contact lenses.

Some current approaches to monitoring dehydration and DED focus on a patient's symptoms, such as fatigue or discomfort. These approaches may not be reliable, and can be imprecise. Other approaches, such as the Schirmer test, may involve the assistance of doctors or medical personnel, and may not be practical for use in the home.

SUMMARY

The present disclosure describes devices, systems, and methods for measuring or sensing osmolarity of body fluids. According to some aspects, a device includes a pair of electrodes configured to be activated with a voltage in the presence of a body fluid, such as tears or sweat, and measure a current based on the applied voltage. The applied voltage is within an electrochemical active range for the material of at least one of the electrodes. Accordingly, the applied voltage causes an electrochemical reaction between the material of the electrode and a solute in the fluid. The electrochemical reaction results in a response current, which can be detected or measured via the other electrode of the device. The device may obtain a plurality of current measurements over a period of time, and may determine the fluid osmolarity based on the plurality of current measurements. For example, the device may determine or measure a charge transfer based on the current measurements, and determine the osmolarity based on the charge transfer. The devices, systems, and methods described herein allow for osmolarity determination that can be less susceptible to electrical noise and tissue background interferences, and with equipment that can be either worn continuously, or stored and/or used more easily in the home.

According to one embodiment, a wearable device for monitoring fluid production is provided. The device includes: a substrate configured to be positioned in the presence of a fluid; a first electrode comprising a conductive film disposed on the substrate; and a second electrode comprising the conductive film disposed on the substrate and spaced from the first electrode; a current measurement circuit configured to: apply a voltage between the first electrode and the second electrode, wherein the voltage is in an electrochemical active range of the conductive film such that a portion of the conductive film dissolves into the fluid; and transmit, to a processor, a signal indicating a current measurement of an electrical current flowing through the fluid including the dissolved portion of the conductive film.

In some embodiments, a surface area of the second electrode is larger than a surface area of the first electrode. In some embodiments, the surface area of the second electrode is at least one order of magnitude larger than the surface area of the first electrode. In some embodiments, the second electrode at least partially surrounds the first electrode. In some embodiments, a distance between the first electrode and the second electrode is less than 1 mm.

In some embodiments, the device further includes: at least one pulsing electrode disposed on the substrate; a pulsing circuit coupled to the at least one pulsing electrode and configured to induce an electrical pulse in the patient's tissue via the at least one pulsing electrode. In some embodiments, the pulsing circuit comprises the processor, the processor in communication with the current measurement circuit, and wherein the pulsing circuit is configured to induce the electrical pulse based on the current measurement. In some embodiments, the at least one pulsing electrode comprises a first pulsing electrode disposed on the substrate and a second pulsing electrode disposed on the substrate. In some embodiments, the at least one pulsing electrode comprises a single pulsing electrode, and wherein the pulsing circuit is configured to induce the electrical pulse between the single pulsing electrode and one of the first electrode or the second electrode.

In some embodiments, the device further includes: a battery disposed on the substrate and a controller disposed on the substrate and configured to receive electrical power from the battery, wherein the controller is configured to apply the voltage between the first electrode and the second electrode. In some embodiments, the device further includes the processor, wherein the processor is configured to: determine a fluid osmolarity based on the current measurement; and output an indication of fluid osmolarity to a user interface device. In some embodiments, the fluid osmolarity is a tear osmolarity. In some embodiments, the fluid osmolarity is a sweat osmolarity.

According to another embodiment of the present disclosure, a tear osmolarity sensor includes: a first electrode disposed on the substrate; and a second electrode disposed on the substrate and spaced from the first electrode; a current measurement circuit configured to: apply a voltage to the first electrode, wherein the voltage is in an electrochemical active range for a conductive material of the first electrode such that the first electrode partially dissolves into tear fluid in contact with the first electrode and the second electrode; obtain a plurality of current measurements over a period of time; and transmit, to a user interface device based on the plurality of current measurements, a signal associated with a tear osmolarity, the current measurement based on the voltage and representative of an electrical current flowing through the fluid with a dissolved portion of at least one of the first electrode or the second electrode.

In some embodiments, the first electrode and the second electrode comprise gold. In other embodiments, the first electrode comprises gold, and wherein the second electrode comprises at least one of silver, platinum, iridium, or an alloy thereof.

According to another embodiment of the present disclosure, a method for detecting an osmolarity of a fluid includes: applying a first voltage between a first electrode and a second electrode, the first electrode comprising a conductive material, wherein the first voltage is in an electrochemical active range for the conductive material such that a portion of the conductive material dissolves into the fluid; measuring, based on the first voltage, a current of an electrical current flowing through the fluid with the dissolved conductive material; determining, based on the measured current, the osmolarity of the fluid; and outputting, to a user interface device, an indication associated with the osmolarity.

In some embodiments, the applying the voltage is based on an amperometry waveform. In some embodiments, the applying the voltage is based on a linear increase square wave voltammetry waveform. In some embodiments, the applying the voltage is based on a linear step increase voltammetry waveform. In some embodiments, the applying the voltage is based on a linear ramp increase waveform. In some embodiments, the applying the voltage is based on a cyclic voltammetry waveform.

In some embodiments, the measuring the current comprises obtaining a plurality of current measurements over a time period; and the determining the osmolarity of the fluid is based on the plurality of current measurements and the time period. In some embodiments, the method further includes: applying, based on at least one of the measured current or the osmolarity of the fluid, an electrical pulse having a second voltage to a patient's tissue. In some embodiments, the fluid comprises tear fluid, and wherein the determining the osmolarity of the fluid comprises determining an osmolarity of the tear fluid. In some embodiments, the fluid comprises sweat, and wherein the determining the osmolarity of the fluid comprises determining an osmolarity of the sweat.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which.

DETAILED DESCRIPTION

Figure 1:
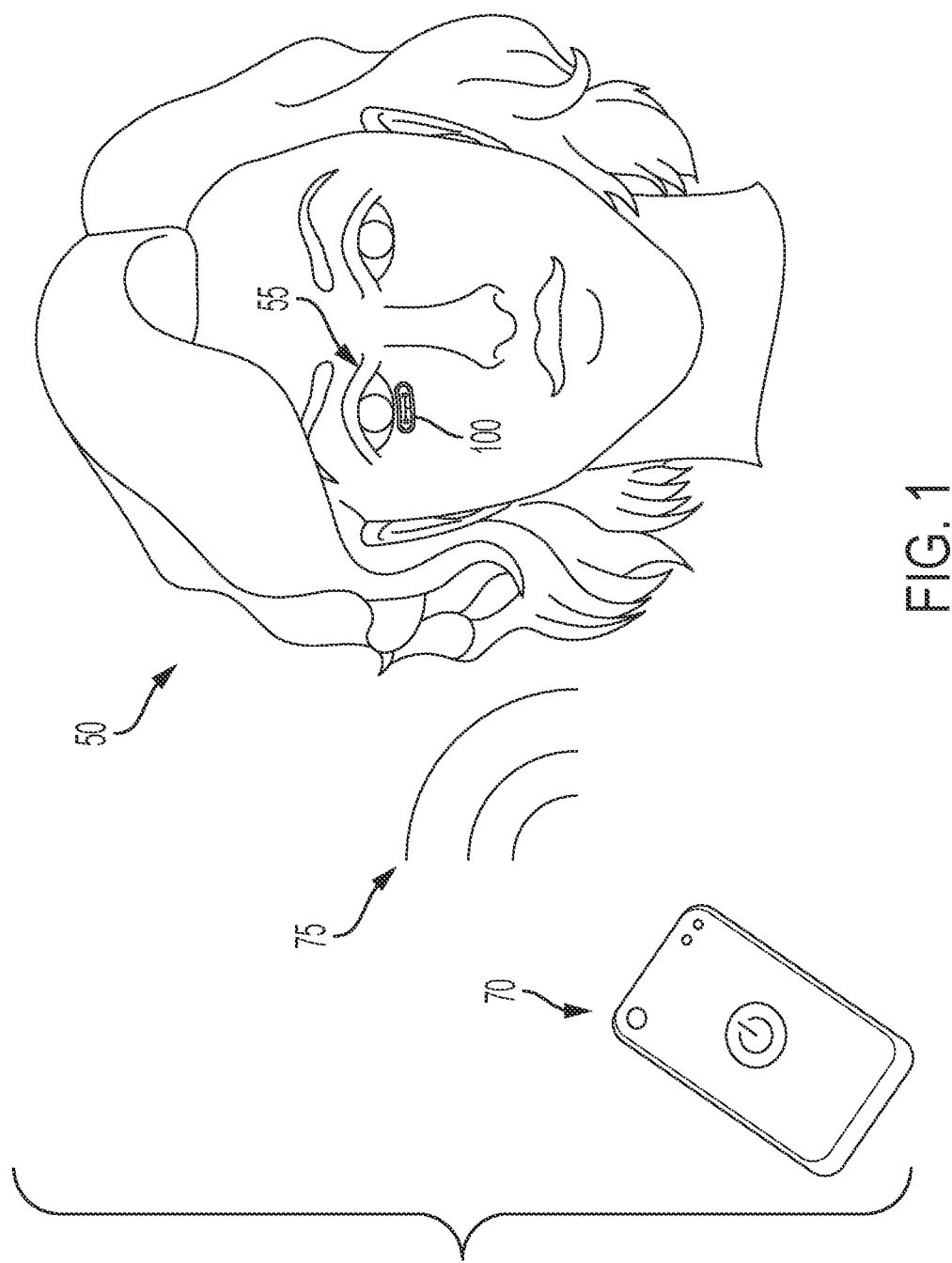
FIG. 1 is a perspective view of an osmolarity sensing device being worn inside a patient's eyelid and being wirelessly controlled by a remote control device, according to aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Fluid osmolarity is a biomarker that may be useful in assessing various conditions and/or illnesses, such as dry eye disease (DED) and dehydration. The osmolarity of a fluid may be determined based on the fluid's freezing point, or the vapor pressure. However, the instruments involved with these measurements may be large and restricted to trained personnel in research labs. Another way to measure the tear osmolarity is to measure the electrical impedance of the fluid. However, electrical impedance-based approaches for measuring osmolarity are susceptible to background noise, which can make the osmolality measurement inaccurate. The present disclosure provides a novel approach for determining the osmolarity of fluids that overcome some of the weaknesses or drawbacks of other techniques for measuring fluid osmolarity. The devices, systems, and methods described herein include wearable devices to achieve continuous, on-demand or autonomous assessment of fluid osmolarity. However, the disclosed devices, systems, and methods also include non-wearable or external devices and systems for measuring osmolarity that achieve some of the same benefits as the wearable embodiments.

In some aspects, fluid osmolarity is related to the solute concentration of the fluid. For example, the osmolarity of tears and/or sweat may be related to the concentration of chloride ions (e.g., sodium chloride, potassium chloride, etc.) in the tear fluid or sweat fluid. The osmolarity may have a linear relationship with the solute concentration, for example. Accordingly, fluid osmolarity may be computed by multiplying a solute concentration by a coefficient. The coefficient may be associated with the type of solute, for example.

Disclosed herein are devices for monitoring the concentration of solutes (e.g., electrolytes) in a patient's body fluids, such as tears and sweat. In some embodiments, an osmolarity sensing device may be a wearable or in vivo device configured to be positioned in contact with the patient's tissues. For example, in one embodiment, an osmolarity sensing device can be configured to be placed underneath the eyelid, and in particular within a patient's fornix, which is a space between the eyelid and the eye. More specifically, some of the devices described herein may be configured to be positioned between, and directly contacting, the palpebral conjunctiva, and the bulbar conjunctiva. The devices may include one surface for facing the eyelid (e.g., palpebral conjunctiva) and another surface for facing the eye (e.g., the sclera and/or the bulbar conjunctiva). In some embodiments, the devices include electrodes configured to cause an electrochemical reaction between the conductive material of the electrodes and the solute in the fluids, such as the tear fluid. The devices may then measure the response current and/or charge transfer associated with the electrochemical reaction. Based on the charge transfer, the devices may then determine the osmolarity of the tear fluid. It may be advantageous for the devices disclosed herein to have relatively small footprints to fit within the confined spaces available within the eyelid, to be flexible and thin to enhance patient comfort. In another aspect, the devices described herein may also include nerve stimulation electrodes and electronics for inducing tear production based on osmolarity measurements, or other electrical measurements associated with fluid osmolarity.

For the purposes of the present disclosure, osmolarity measurements may refer to solute concentration (e.g., chloride ion concentration), instead of or in addition to osmolarity measurements. For example, in the present disclosure, osmolarity measurements may be described in units of milliosmoles per kilogram of water (mOsm/kg H2O), millimoles of chloride ions per liter of water (mmol/L), and/or in parts per million (ppm) of chloride ions in water. In this regard, osmolarity may be understood to also include or contemplate physical properties of a fluid that are correlated with osmolarity, including chloride ion concentration. Thus, although the embodiments described below may be described in terms of osmolarity measurements, it will be understood that the embodiments of the present disclosure include or contemplate any suitable fluid measurement correlated to osmolarity, such as chloride ion concentration.

In some embodiments, an osmolality sensing device may include an ex vivo device configured to be used in a non-wearable fashion. For example, an osmolarity sensing device may be configured to receive and retain a fluid from the patient in contact with the electrodes. In any case, the devices disclosed herein may be configured to provide a voltage to at least one of the electrodes, where the voltage is within an electrochemical active range of the material of at least one of the electrodes. The electrochemical reaction caused by the voltage may induce a response current, which can be measured by the osmolarity sensing device. The osmolarity sensing devices described herein may then determine an osmolarity of the fluid based on one or more current measurements obtained over a period of time. In particular, the osmolarity sensing devices described herein may determine a charge transfer over a duration, and determine the osmolarity of the fluid based on the charge transfer. In some aspects, the osmolarity sensing devices described herein may be included with, or combined with, one or more therapeutic devices. For example, an osmolarity sensing device may be included in a gland stimulation device, such as one of the devices described in U.S. Provisional Patent Application No. 63/220,828, filed Jul. 12, 2021, U.S. application Ser. No. 17/391,835, filed Aug. 2, 2021, and U.S. patent application Ser. No. 15/931,241, filed May 13, 2020, the entireties of which are incorporated by reference herein.

FIG. 1 is a perspective view of a patient 50 wearing an osmolarity sensing device 100 inside the bottom eyelid below the eye 55. The device 100 may include two or more electrodes configured to induce an electrochemical reaction between the electrode material and the tear fluid, and measure the resulting response current. The device 100 is controlled by a remote control device 70, which emits electromagnetic energy 75 toward the device 100. In some aspects, the remote control device 70 may be referred to as a transmitter, controller, and/or a user interface device. The remote control device 70 may be powered by an internal battery, and may be compact and portable such that the patient 50 can carry the remote control device 70 with her wherever she goes. Accordingly, the patient 50 may use the remote control device 70 to activate the electrodes of the device 100 at the onset of dry eye symptoms, for example. In some aspects, the patient 50 may use the remote control device 70 to activate the device 100 according to a pre-defined or prescribed schedule.

In some embodiments, the wireless remote control device 70 may include a smart phone device configured with NFC capabilities. In some aspects, the remote control device 70 may record usage data, and/or ensure patient safety. In some aspects, the remote control device 70 may be configured to run an app that helps with disease management and compliance. The remote control device 70 may further include one or more user interface elements, such as a display, a speaker, and/or one or more indicator lights. For example, the remote control device 70 may be configured to display an indicator of the fluid osmolarity and/or a physiological state or condition of the patient 50. For example, the remote control device 70 may be configured to display a severity or level of dry eye, dehydration, or another other osmolarity-related condition.

In some embodiments, the device 100 may include additional electrodes and additional circuitry for stimulating nerves to induce tear production. For example, the device 100 may include a first stimulation electrode and a second stimulation electrode configured to stimulate the bulbar conjunctive, the lacrimal glands, or any other suitable nerve area of the tissue to induce tear production. In some embodiments, the device 100 may be configured to stimulate the nerves and/or tissue based on feedback provided by the osmolarity sensing circuitry of the device 100. For example, the device 100 may be configured to reduce the frequency of stimulation, the intensity of the stimulation, and/or other parameters of the stimulation procedure based on osmolarity measurements.

It will be understood that, although embodiments of the present disclosure may be described with respect to human patients, the devices, systems, and methods described herein may also apply to non-human diagnostic and therapeutic interventions, including animal diagnostic and therapeutic interventions.

Figure 2:
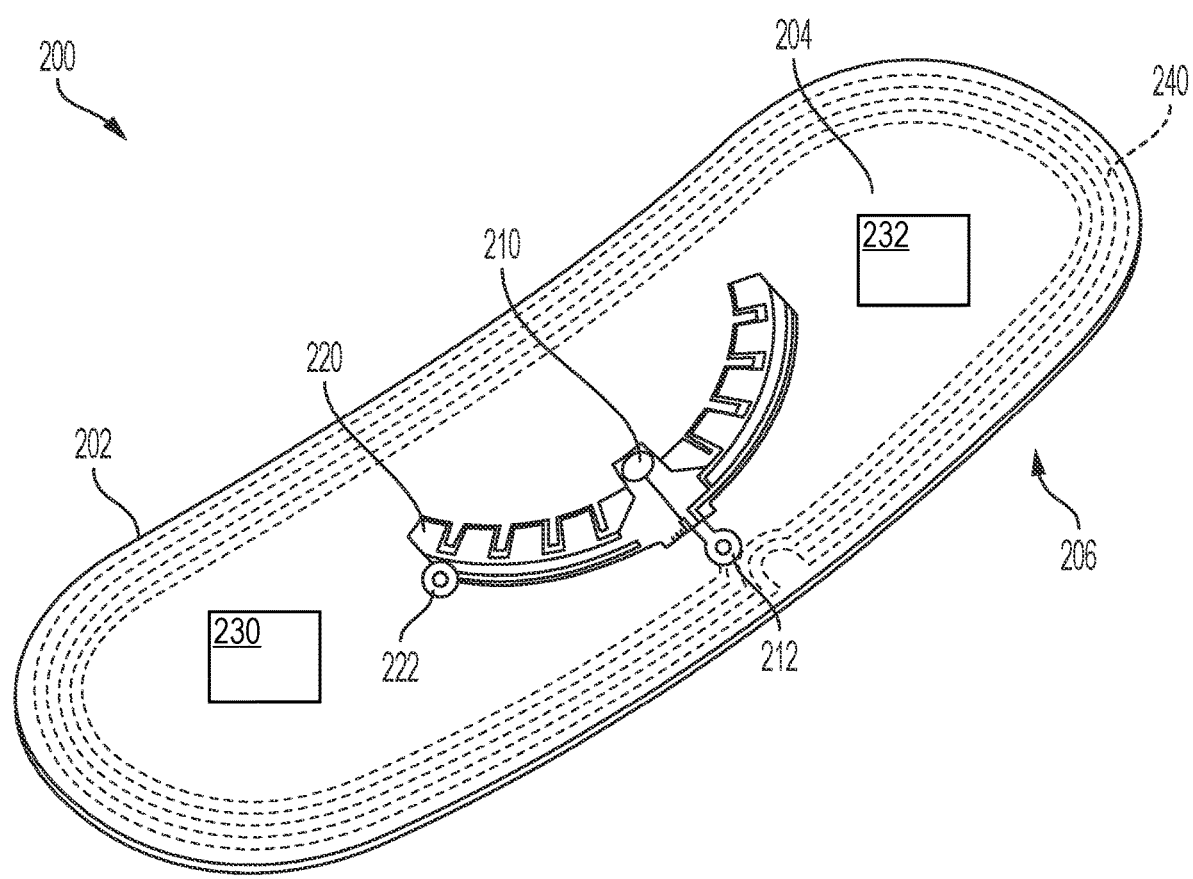
FIG. 2 is a perspective view of an osmolarity sensing device for stimulating nerves in and around a patient's eye, according to aspects of the present disclosure.

FIG. 2 is a perspective view of a wearable osmolarity sensing device 200 configured to be worn underneath a patient's eyelid (e.g., in the fornix). The device 200 is flexible along at least one axis and is sized, shaped, and otherwise configured to be worn inside the patient's eyelid. The device 200 includes electrodes 210, 220 configured to induce an electrochemical reaction with the tear fluid and measure a resulting response current. The measured response current may be used to determine the osmolarity of the tear fluid. Additional details regarding the electrochemical osmolarity sensing procedure will be further described below with respect to FIGS. 4-8.

The first electrode 210 and the second electrode 220 are disposed on a first side 204 of a substrate 202. An antenna 240 is disposed on opposing second side 206 of the substrate 202 and is configured to receive electromagnetic energy from a wireless device (e.g. remote control 70 shown in FIG. 1), and to harness the electromagnetic energy to produce electrical power for the components of the device 200. Additional electronic circuitry 230, 232 is also attached to the substrate 202. The circuitry 230, 232 may include electronic components, including circuitry for generating a voltage and measuring a current. The circuitry 230, 232 may be in electrical communication with the antenna 240 and the electrodes 210, and 220. Although shown with an antenna 240, in some embodiments, the device 200 may include a battery to power the electrodes 210, 220, and any other electronic components of the device 200. In some aspects, the one or both of the circuitries 230, 232 includes an integrated circuit, such as an application-specific integrated circuit (ASIC). In other aspects, one or both of the circuitries includes discrete surface-mount electronic components mounted to the substrate 202, such as capacitors, resistors, diodes, inductors, transistors, and/or any other suitable discrete surface mount component. In some embodiments, the circuitries 230, 232 include one or more ASICs in addition to one or more discrete surface mount components. The electronic components may further include electronics that improve or increase the safety of the device. In some embodiments, one of the circuitries 230, 232 includes voltage generator and current measurement circuitry, and the other circuitry includes communication circuitry and/or power management circuitry. In other embodiments, the device 200 may include a single area or region of the substrate 202 with contains electronic circuitry. In some embodiments, one or both of the circuitries includes the components of the system 800 described below. In some aspects, at least one of the circuitries 230, 232 includes a memory device having instructions, and a processor or controller configured to execute the instructions, such that the processor and memory comprise the modules and components of the system 800.

The substrate 202 may include a flexible polymer material, such as a liquid crystal polymer (LCP), a polyamide (e.g., KAPTON®), or any other suitable type of substrate. The substrate 202 is configured to bow, bend, or flex along at least one axis, and is configured to electrically isolate the electrical components (electrodes 210, 220, antenna 240) from one another. The substrate 202 may include a single layer of material, or multiple layers of a same material or of different materials. For example, in some embodiments, the substrate 202 includes at least two layers of a polymer material, with the antenna 240 disposed between two of the layers of material. The substrate 202 provides sufficient electrical isolation for the variety of electronic components, the electrodes 210, 220, and the antenna 240.

The first electrode 210 may be referred to as a sensing electrode. The first electrode includes a relatively circular shape, and is at least partially surrounded by the second electrode 220. In the illustrated embodiment, the second electrode 220 includes a semicircular shape positioned at least partially around the first electrode 210. The surface area of the second electrode 220 is larger than the surface area of the first electrode 210. In the illustrated example, the surface area of the second electrode 220 may be approximately forty times larger than the surface area of the first electrode 210. However, the surface area of the second electrode 220 may be smaller than the first electrode 210, the same size as the first electrode 210, 10 times larger, 20 times larger, 30 times, larger, or any other suitable multiple larger than the surface area of the first electrode 210.

The relatively larger surface area of the second electrode 220 may provide several advantages. For example, the device 200 may be configured to induce a voltage via the first electrode 210 so that an electrochemical reaction occurs between the first electrode 210 and the solutes in the tear fluid. The electrochemical reaction causes a portion of the conductive material of the first electrode 210 to be dissolved into the fluid. For example, the first electrode 210 may comprise gold. The device 200 may be configured to induce a voltage within an electrochemical active region of gold to reactive portion of the gold of the first electrode 210 with the solutes in the fluid (e.g., NaCl, KCl). Accordingly, the relatively larger size of the second electrode may increase the longevity of the device 200, and may reduce or mitigate changes in current measurements caused by wearing and aging of the first electrode 210. Further, the larger size of the second electrode 220 may reduce the current density thus increasing the electrical stability of the second electrode. Accordingly, the accuracy of the current measurement and charge transfer measurement, as measured using the second electrode 220, may be increased.

In some embodiments, the first electrode 210 may have a circular shape and may have a diameter of 50 μm or greater. For example, in some embodiments, the sensing electrode may have a diameter or width of 100 μm, 200 μm, 300 μm, 500 μm, 600 μm, 1 mm, and/or any other suitable size, both greater or smaller. The electrodes 210, 220 may be powered by the antenna 240. The electrodes 210, 220 may be sized and shaped to occupy a significant portion of the footprint of the loop antenna 240. This regard, it may be advantageous for each electrode 210, 220 occupy a relatively large portion of the total surface area of the device 100. In this regard, measuring the osmolarity of the tear fluid may be improved by greater contact areas of the electrodes 210, 220 and the tear fluid.

The electrodes 210, 220 may comprise metallic traces, films, or foils disposed on the substrate 202. For example, the electrodes 210, 220 may be disposed on the substrate 202 by chemical vapor deposition, sputtering, laser welding, mounting, adhesion, manual fabrication, or any other suitable process. The electrodes 210, 220 may include a biocompatible conductive material, such as gold, platinum, iridium, alloys that include gold, platinum, and/or iridium, or any other suitable material. Similarly, the antenna 240 may comprise one or more traces of a conductive material, such as gold, platinum, iridium, and/or alloys thereof. For example, in some embodiments the antenna 240 and the electrodes 210, 220 comprise a same type of material in other embodiments, the electrodes 210, 220 comprise a different material in the antenna 240.

In the illustrated embodiment, the antenna 240 includes a spiral of metallic traces having four loops. The four loops may be concentric and non-overlapping such that the antenna 240 can be deposited on the substrate 202 in a single manufacturing step. However, it will be understood that in other embodiments, the loop antenna 240 may differ from what is shown in one or more aspects. For example, the loop antenna 240 may include fewer or more loops than what is shown in FIG. 2. In some embodiments, the loop antenna 240 includes a single loop of metallic material. In some embodiments, the loop antenna 240 may include multiple electrically connected traces that are not disposed in a spiral shape. For example, the antenna 240 may include distinct concentric loop traces. The antenna 240 may occupy a greater or lesser amount of the available surface area on the device 200 than what is shown in FIG. 2. Further, although the antenna 240 defines a kidney or bean shape, it will be understood that the antenna 240 may define other shapes, such as elliptical, circular, rectangular, triangular, or any other suitable shape. The antenna 240 is disposed on an opposite side of the substrate 202 than the electrodes 210, 220. Accordingly, although the electrodes 210, 220 overlap with the antenna 240, the electrodes 210, 220 are isolated from the antenna 240 by the substrate 202.

The device 200 includes vias 212, 222, which provide points of electrical connection between the electrodes 210, 220, and other electronic components of the device 200 and/or the antenna 240, which are disposed on the opposite side of the substrate 202 The vias 212, 222 may include a hole or aperture extending through the substrate 202, where the walls or interior surfaces defining the aperture are covered by a conductive material, such as gold, platinum, iridium, alloys thereof, or any other suitable conductive material.

The circuitries 230, 232 of the device 200 may include an electrical rectifier to modulate the electromagnetic energy provided by the antenna 240 into direct current. Further, the circuitries 230, 232 of the device 200 may include electronic control components to selectively activate one or both of the electrodes 210, 220. The electronic components may be connected to each other, to the electrodes 210, 220, and/or to the antenna 240 by one or more conductive traces, filars, or other conductors coupled to or disposed on the substrate 202. The embodiment shown in FIG. 2 may be configured for battery-less operation in which the device 200 is powered solely by a wireless device. Battery-less operation may allow for a smaller and more comfortable form factor. In other embodiments, the device 200 may include a battery to allow for occasional nerve stimulation according to a configured schedule stored in a memory of an ASIC.

Although described in the context of tear osmolarity sensing, it will be understood that the device 200 may be used as a wearable device to detect the osmolarity of other fluids, such as sweat. For example, the device 200 may be used as a stick-on patch that is worn on the skin (e.g., under the arm) and is configured to measure or detect the osmolarity of a patient's sweat. Further, the device 200 may have other shapes or profiles, such as square, rectangular, circular, oval, or any other suitable shape.

Figure 3:
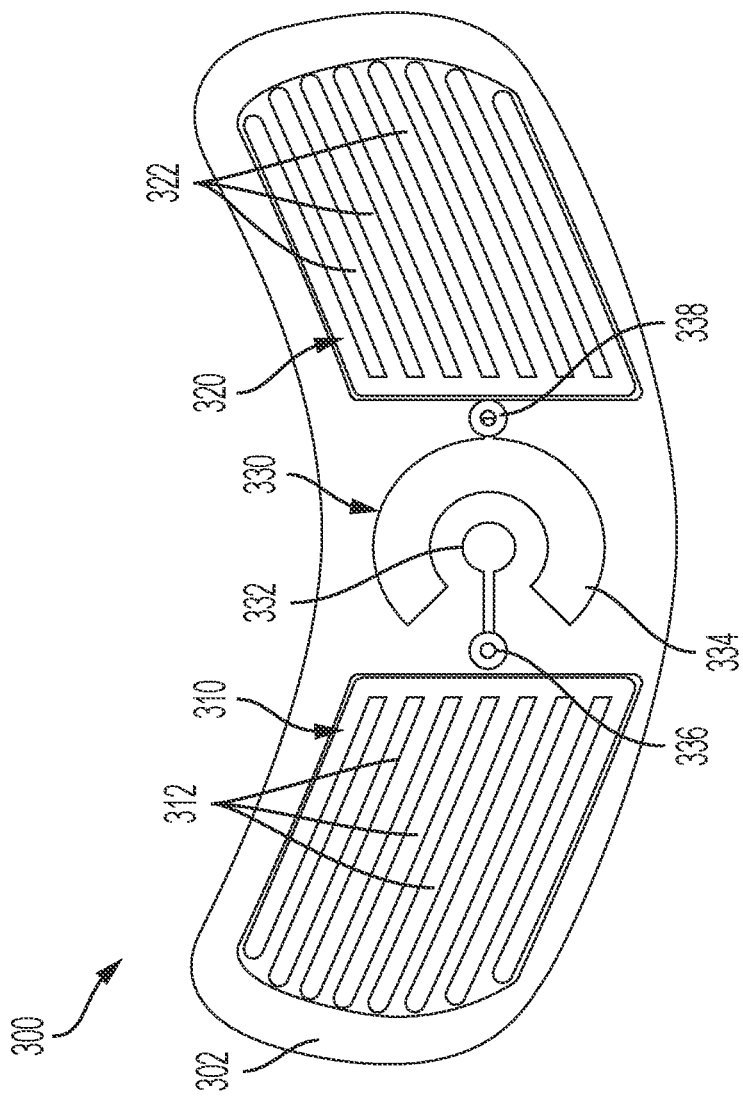
FIG. 3 is a top plan view of a combined osmolarity sensing and therapeutic device for stimulating nerves in and around a patient's eye, according to some aspects of the present disclosure.

FIG. 3 shows a top plan view of a combined osmolarity sensing and nerve stimulation device 300. The device 300 has a bean shape or kidney shape. The shape of the device 300 may correspond to the available space within the patient's fornix, which is the space between the eyelid and the surface of the eye. Further, the shape of the device 300 may be selected accounting for curvature of the device 300 in at least one axis while being worn by a patient. In some aspects, the bean shape may allow the device 300 to conform to the volume available in the fornix, and to conform to the curvature of the cornea to facilitate contact of the electrodes with the bulbar conjunctiva, sclera, and/or the limbus. The device includes a first electrode 310 and a second electrode 320 configured to perform nerve stimulation to induce tear production. The device 300 is further configured to sense or measure an osmolarity of tear fluid using an osmolarity sensing module 330 including a sensing electrode 332 and a counter electrode 334.

A large portion of the footprint of the device 300 is occupied by the electrodes 310, 320. The osmolarity sensing module 330 is disposed in a region between the electrodes 310, 320. In other embodiments, the osmolarity sensing module 330 may be positioned below, above, or to the right or to the left of the electrodes 310, 320. In other embodiments, the osmolarity sensing module 330 may be positioned on the reverse side of the substrate 302. In one embodiment, the electrodes 332, 334 of the osmolarity sensing module 330 may include a same type of material as one or both of the electrodes 310, 320. In the illustrated embodiment, the counter electrode 334 has a larger surface area than the sensing electrode 332. In an exemplary embodiment, the counter electrode 334 may be approximately 30, 40, or 50 times larger than the sensing electrode 332. As explained further below, the relatively larger size of the counter electrode 334 may improve the longevity of the osmolarity sensing module 330, and improve the accuracy and/or sensitivity of the osmolarity sensing module 330. For example, if the counter electrode 334 is too small, the response current caused by the electrochemical reaction of the osmolarity sensing procedure may be too small to detect. Accordingly, providing a counter electrode 334 that is several times larger than the sensing electrode 332 facilitates the current measurement.

In the illustrated embodiment, the counter electrode 334 partially surrounds the circular sensing electrode 332. The counter electrode 334 is spaced from the sensing electrode by a distance 335. In some aspects, it may be desirable to position and arrange the electrodes 332, 334 so that the distance 335 is within 1 mm. However, these values are merely exemplary and may be increased or decreased without departing from the scope of the present disclosure. The electrodes 332, 334 include respective vias 336, 338, which may pass through the substrate 302 to provide an electrical connection with electronic components disposed on an opposing side of the substrate 302.

The electrodes 310, 320 have a slotted design defined by a plurality of respective prongs 312, 322. The slotted design of the electrodes 310, 320 may facilitate magnetic coupling of the device 300 with an external wireless power source, such as the wireless remote control device 70 shown in FIG.

1. Additional details for the electrodes 310, 320 may be found in U.S. Provisional Patent Application No. 63/220,828, filed Jul. 12, 2021, the entirety of which is incorporated by reference herein.

As mentioned above, the osmolarity sensing module 330 may be used in conjunction with the stimulating electrodes 310, 320 to perform a closed loop nerve stimulation procedure for dry eye therapy. For example, in some aspects, the osmolarity sensing module 330 may be configured to obtain one or more osmolarity measurements periodically, and activate the stimulation electrodes 310, 320 based on the osmolarity measurements. For example, the device 300 may be configured to activate the stimulating electrodes 310, 320 based on the osmolarity measurement exceeding a threshold. Further, the device 300 may be configured to cease the nerve stimulation procedure when the osmolarity measurements fall below the threshold. In another aspect, feedback from the osmolarity sensing module 330 may be used to control one or more parameters of the nerve stimulation procedure. For example, feedback from the osmolarity sensing module 330 may be used to control the duration, frequency, and/or intensity of the nerve stimulation procedure. For example, feedback from the osmolarity sensing could predict the trend of patient's eye dryness and send warning signals and generate preventative nerve stimulation.

Figure 4:
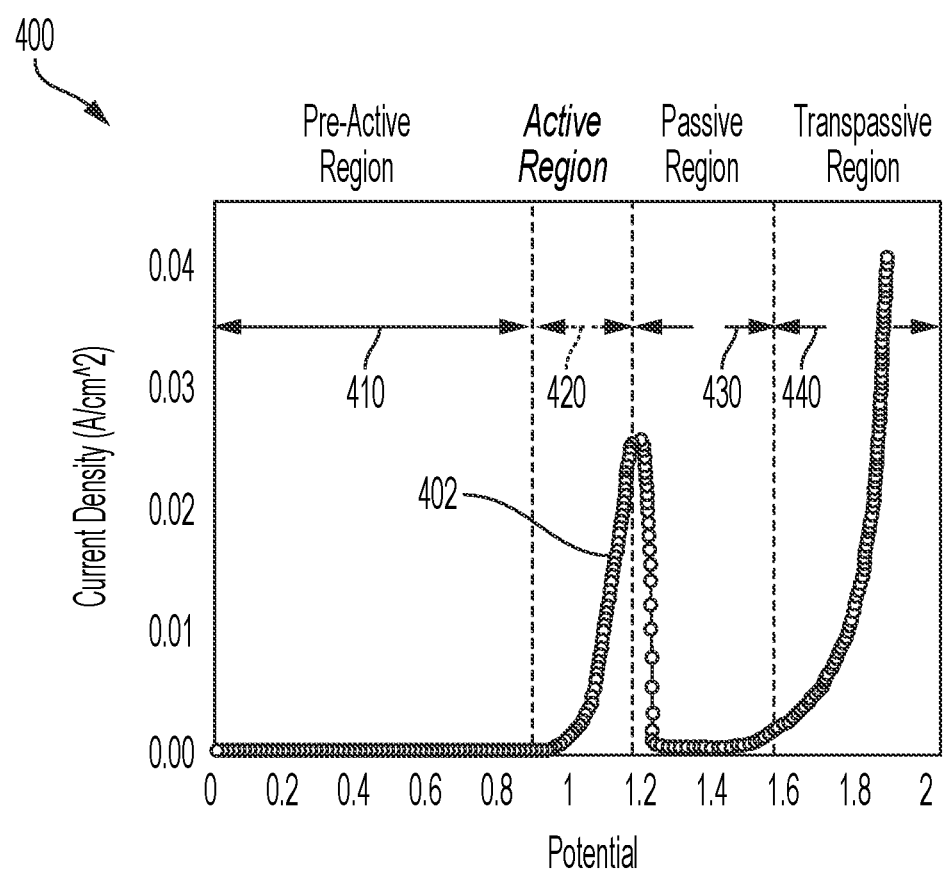
FIG. 4 is a graph of a current density of an electrode material in the presence of a solute as a function of electrical potential, according to some aspects of the present disclosure.

FIG. 4 is a graph 400 of a current density as a function of voltage or potential for a conductive material, such as gold, in the presence of an electrolyte, such as NaCl. The plot 402 of the current density is shown in a plurality of regions or phases 410, 420, 430, 440. As shown, the current density increases significantly within an active region 420 relative to a pre-active region 410. The current density rapidly decreases in a passive region 430, and rises again in a trans-passive region 440. In some aspects, the curve or profile of the plot 402 may be specific to the material. For example, the current density vs. potential curve may be different for silver or platinum. In some aspects, the osmolarity sensing devices or sensing systems described herein may be configured to apply voltages within the active region 420 of the material of at least one of the electrodes. For example, an osmolarity sensing device may include a voltage generator circuit configured to apply a voltage within the active region for the counter electrode (e.g., 220, 334). The counter electrode may include gold, silver, platinum, alloys thereof, and/or any other suitable conductive material.

FIGS. 5A-5E illustrate voltage waveforms for use in fluid osmolarity sensing. For example, a voltage generator of an osmolarity sensing device may be configured to generate a time-varying voltage waveform or voltage profile based on one or more of the waveforms 500a-500e. In some aspects, a voltage generator may include a controller and/or one or more analog electronic components (e.g., resistors, capacitors, diodes, inductors, switches, transistors) configured to receive a supply voltage from a supply voltage source (e.g., battery, transformer, loop inductor, power supply, etc.), and to output one or more of the voltage waveforms 500a-500e shown below. In an exemplary aspect, the voltage generator may be configured to receive an AC voltage or a DC voltage from the voltage source, and to output a DC voltage. The voltage generator may be configurable to change or select voltage waveforms based on user inputs, and/or to change or select different operating parameters (e.g., amplitude, duration, step size, ramp rate). In some aspects, the voltage waveforms 500a-500e may be used to both: (1) induce an electrochemical reaction between the material of at least one electrode and a solute in the fluid, and (2) measure the current and/or charge density resulting from the reaction.

Figure 5A:
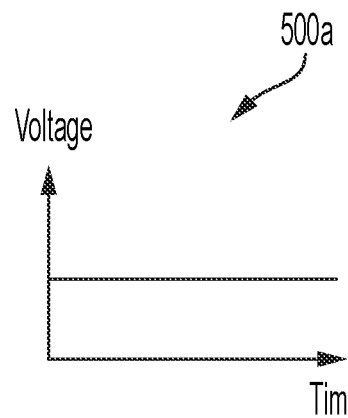
FIG. 5A is a graph of an amperometry voltage waveform that may be used in an osmolarity sensing procedure, according to some aspects of the present disclosure.

FIG. 5A shows a flat voltage waveform 500a, which may be referred to as an amperometry waveform. In some aspects, an osmolarity sensing device may be configured to apply the amperometry voltage waveform 500a having a voltage between 0.8. v and 1.5 v. The osmolarity sensing device may be configured to apply the waveform 500a in a constant fashion or in a pulsed fashion. For example, in some aspects, the osmolarity sensing device may be configured to apply the waveform 500a for a time period ranging from one second to one minute. However, it will be understood that the values for voltage and duration described herein are exemplary, and that other values for voltage and/or time duration may be used without departing from the scope of the present disclosure.

Figure 5B:
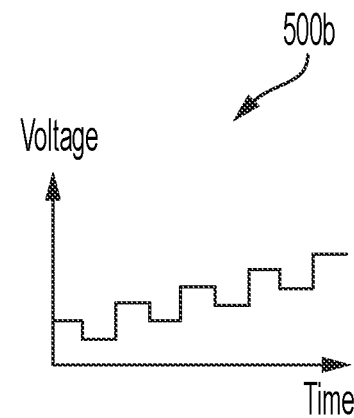
FIG. 5B is a graph of a linear increase square wave voltammetry waveform that may be used in an osmolarity sensing procedure, according to some aspects of the present disclosure.

FIG. 5B shows a linear increase square wave voltammetry waveform 500b. The linear increase square wave voltammetry waveform 500b can be described as having a series or pattern of steps, where the series of steps includes a sequence of drops in voltage alternating with relatively larger increases in voltage, such that the average voltage increases with time. In some aspects, the waveform 500b may reduce the background noise and improve the sensitivity of current measurements. In one embodiment, the voltage can ramp up from 0.5 v to 1.5 v with a ramping rate of 0.4v/s or smaller. In some aspects, the voltage and ramping rate may be based on the sensor design. In some embodiments, the parameters can be fixed. In other embodiments, the parameters can be variable. In other words, the voltage generator circuit may be configured to apply the waveform 500b using fixed parameters, and in other embodiments, the voltage generator circuit may be configured to apply the waveform 500b using variable parameters.

Figure 5C:
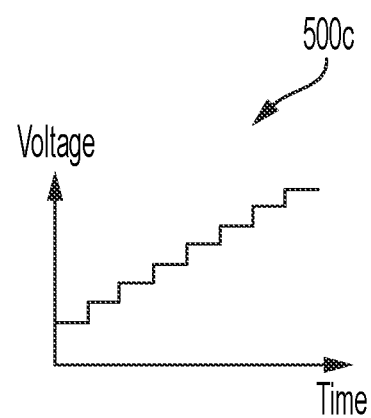
FIG. 5C is a graph of linear step increase voltammetry waveform that may be used in an osmolarity sensing procedure, according to some aspects of the present disclosure.

FIG. 5C shows a linear step increase voltammetry waveform 500c. The linear step increase voltammetry waveform 500c includes a series or sequence of linear steps, such that each step includes a duration of a constant voltage. The steps may each have the same duration, or a different duration. In some aspects, all of the steps may be within an active region of the material of at least one of the electrodes. In other aspects, only a portion of the steps of the waveform 500c are within the active region. The waveform 500c may provide for a higher sensitivity in a current measurement relative the waveform 500a, in some aspects. In some embodiments, the voltage may ramp up from 0.5 v to 1.5 v, with a ramping rate of 0.4 v/s or smaller. In some aspects, the voltage and ramping rate may be based on the sensor design. In some embodiments, the parameters can be fixed. In other embodiments, the parameters can be variable. In other words, the voltage generator circuit may be configured to apply the waveform 500c using fixed parameters, and in other embodiments, the voltage generator circuit may be configured to apply the waveform 500c using variable parameters.

Figure 5D:
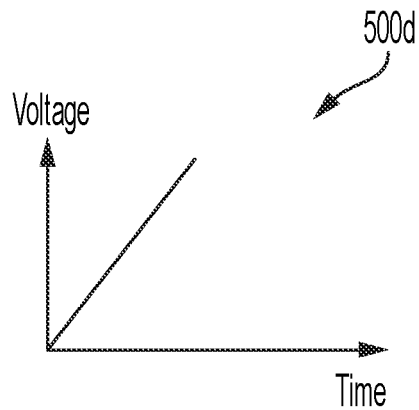
FIG. 5D is a graph of a linear ramp increase voltammetry waveform that may be used in an osmolarity sensing procedure, according to some aspects of the present disclosure.

FIG. 5D shows a linear ramp increase voltammetry waveform 500d. The linear ramp increase voltammetry waveform 500d includes a continuously, linearly increasing voltage. In some aspects, the entirety of the waveform 500d may be within an active region of the material of at least one of the electrodes. In other aspects, only a portion of the waveform 500d is within the active region. In some embodiments, the voltage may ramp up from 0.5 v to 1.5 v, with a ramping rate of 0.4 v/s or smaller. In some aspects, the voltage and/or ramping rates may be based on the sensor design. In some embodiments, the parameters can be fixed. In other embodiments, the parameters can be variable. In other words, the voltage generator circuit may be configured to apply the waveform 500d using fixed parameters, and in other embodiments, the voltage generator circuit may be configured to apply the waveform 500d using variable parameters.

Figure 5E:
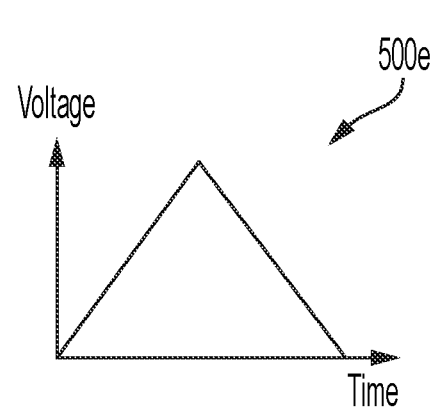
FIG. 5E is a graph of cyclic voltammetry waveform that may be used in an osmolarity sensing procedure, according to some aspects of the present disclosure.

FIG. 5E shows a cyclic voltammetry waveform 500e. The cyclic voltammetry waveform 500e includes first portion having a continuously, linearly increasing voltage, and a second portion having a continuously, linearly decreasing voltage. In some aspects, the entirety of the waveform 500e may be within an active region of the material of at least one of the electrodes. In other aspects, only a portion of the waveform 500e is within the active region. In some embodiments, the voltage may ramp up from 0.5 v to 1.5 v, and down from 1.5 v to 0.5v. In some embodiments, the voltage may ramp up with a ramping rate of 0.4 v/s or smaller, and ramp down with a ramping rate of −0.4 v/s or smaller. In some aspects, the voltages and/or ramping rates may be based on the sensor design. In some embodiments, the parameters can be fixed. In other embodiments, the parameters can be variable. In other words, the voltage generator circuit may be configured to apply the waveform 500e using fixed parameters, and in other embodiments, the voltage generator circuit may be configured to apply the waveform 500e using variable parameters.

In some aspects, an osmolarity sensing device may determine a charge transfer during a period associated with a voltage applied using one of the waveforms 500a-500e. The charge transfer may be associated with the area underneath the curve of the applied waveform. Further, the osmolarity sensing device may be configured to determine and/or indicate an osmolarity of the fluid based on the determined charge transfer. It will be understood that the waveforms, voltage and ramping values, and other parameters described above are exemplary and that other waveforms, voltage and/or ramping values can be used without departing from the scope of the present disclosure.

Figure 6A:
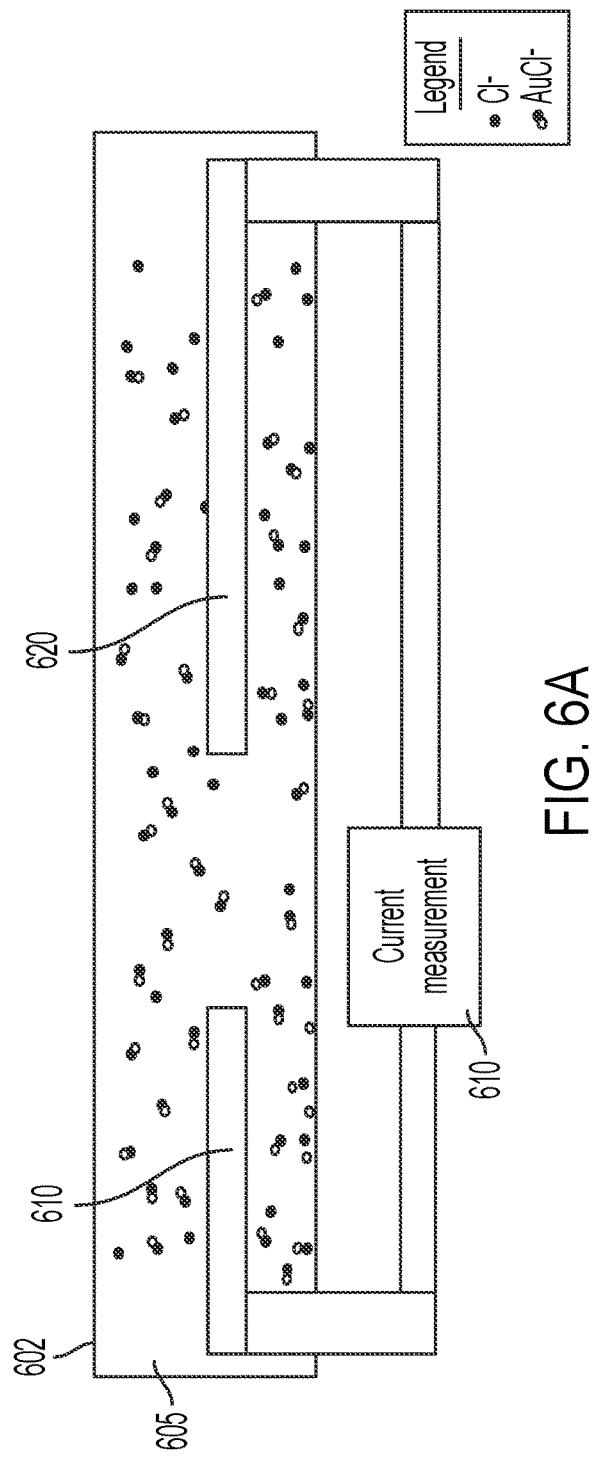
FIG. 6A is a diagrammatic view of an osmolarity sensing circuit determining an osmolarity of a first fluid, according to aspects of the present disclosure.
Figure 6B:
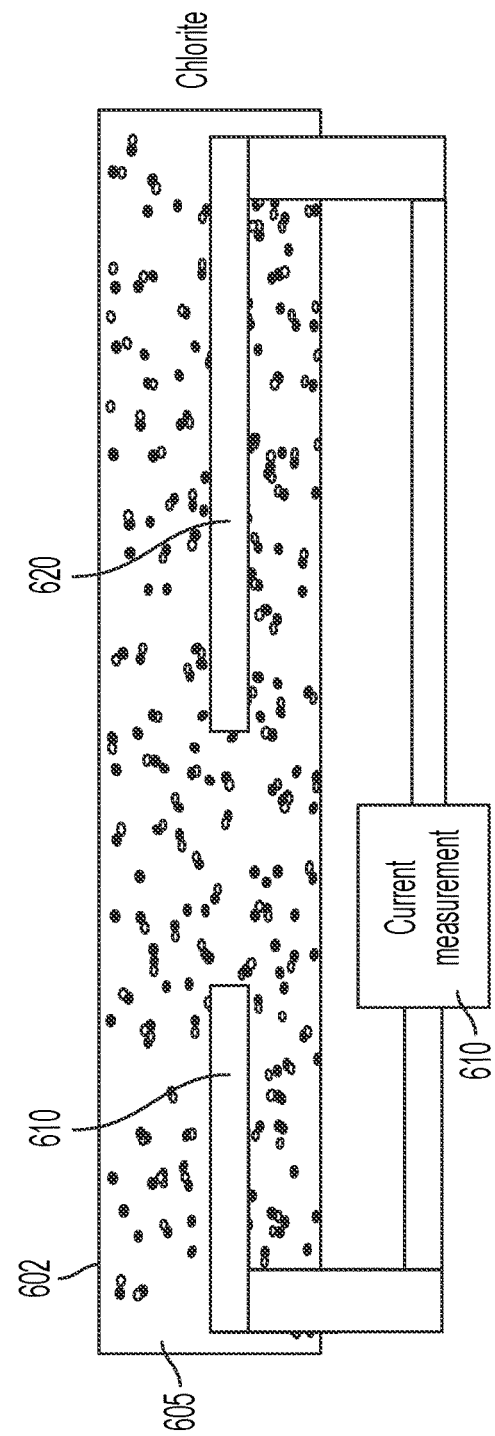
FIG. 6B is a diagrammatic view of an osmolarity sensing circuit determining an osmolarity of a second fluid, according to aspects of the present disclosure.

FIGS. 6A and 6B are diagrammatic views of a tear osmolarity sensing circuit 600, according to aspects of the present disclosure. The osmolarity sensing circuit 600 includes a first electrode 610 and a second electrode 620 in the presence of a fluid 605. In some embodiments, the electrodes 610, 620, may be disposed on a wearable sensing device (e.g., 100, 200, 300). For example, the electrodes 610, 620 may be disposed on a substrate and positioned against the patient's tissue and/or fluid. In other embodiments, the electrodes 610, 620 may not be disposed on a wearable device. For example, the electrodes 610, 620 may be used externally to a patient, such that the fluid 605 is taken from the patient and placed in contact with the electrodes 610, 620 away from the patient. In some embodiments, the fluid 605 may be a biological fluid, such as tears or sweat. In other embodiments, the fluid 605 may be a non-biological fluid and/or solution.

The circuit 600 further includes a current measurement circuit 630 in communication with the first electrode 610 and the second electrode. In some aspects, the current measurement circuit 630 includes circuitry for inducing a voltage and measuring a current. For example, the circuit 630 may be configured to apply a voltage based on one or more of the waveforms 500a-500e to cause material from at least one of the electrodes 610, 620 to react with a solute in the fluid 605. For example, the circuit 630 may be configured to apply a voltage or potential to the first electrode 610 to cause at least a portion of the first electrode 610 to react with a solute in the fluid 605. Further, the circuit 630 may be configured to measure a current using the second electrode 620. In this regard, the first electrode 610 may be referred to as a sensing electrode 610, and the second electrode 620 may be referred to as a counter electrode. In the illustrated example, the solute may include chlorine ions, such as chlorite ($Cl^-$). Although referred to as chlorite, it will be understood that the chlorine in the fluid may be in the form of NaCl, KCl, and/or any other suitable chloride molecule. The voltage applied to the electrode 610 may cause the material of the electrode 610 to react with the solute and dissolve into the fluid 605. The reaction causes a net current to flow through the second electrode 620, which can be measured and detected. In some aspects, the circuit 600 may obtain current measurements, and determine a charge transfer based on the current measurements.

As explained above, the amount of material of the electrode(s) 620, 610 that reacts and dissolves into the fluid 605 may be based on the voltage applied and the concentration of a reactive solute or electrolyte in the fluid 605. Accordingly, the concentration of at least some of the electrolytes may increase the amount of conductive material that reacts and dissolves into the fluid 605. An increased concentration of dissolved electrode material may increase the current between the electrodes 610, 620. The current measurement circuit 630 may obtain a plurality of current measurements over one or more time periods. The measured current over time may be used to measure a charge transfer, where the charge transfer is proportional to the concentration of the solute in the fluid. FIG. 6A illustrates an electrochemical reaction with $Cl^-$ and Au having a first concentration of $Cl^-$, and FIG. 6B illustrates the electrochemical reaction with $Cl^-$ and Au having a second concentration of $Cl^-$ greater than the first concentration. As shown, the higher concentration of $Cl^-$ in FIG. 6B, which is associated with a higher osmolarity, causes a greater amount of Au to react and dissolve into the fluid 605. Accordingly, the current measurement circuit 630 may measure a relatively higher current and charge transfer with the $Cl^-$ concentration of FIG. 6B compared to the $Cl^-$ concentration of FIG. 6A.

The measured charge transfer may be associated with the osmolarity of the fluid. For example, in some aspects, the charge transfer may be proportional to the osmolarity of the fluid. Accordingly, a processor may determine the osmolarity of the fluid based on the determined charge transfer and/or based on a plurality of current measurements over a period of time. In other embodiments, the processor may determine the osmolarity of the fluid based on a time-based curve of the current measurements. For example, an osmolarity sensing device may include a processor configured to use a polynomial fit function, and may determine the osmolarity based on the determined coefficients of the polynomial fit function.

The processor and/or another device (e.g., user interface device) may indicate a physiological measurement or status of the patient based on the osmolarity determined as described above. For example, a processor may use the osmolarity to indicate whether the patient has dry eye, and/or the severity or extent of dry eye (e.g., healthy eye, mild dry eye, moderate dry eye, severe dry eye). In another embodiment, the osmolarity of the fluid may be used to determine a hydration status of the patient. For example, a processor may determine and indicate whether the patient is sufficiently hydrated, mildly dehydrated, moderately dehydrated, or severely dehydrated.

Figure 7:
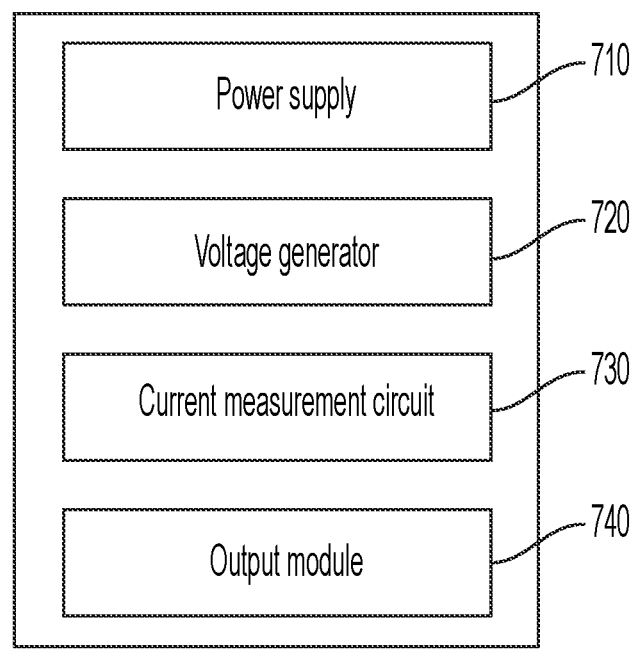
FIG. 7 is a diagrammatic view of an osmolarity sensing system, according to aspects of the present disclosure.

FIG. 7 is a diagrammatic view of an osmolarity sensing system 700, according to an embodiment of the present disclosure. The osmolarity sensing system 700 may include one or more devices that may or may not be physically coupled to one another. In one embodiment, the system 700 includes an integrated system that may be used as a single, integral device. In another embodiment, the system 700 includes multiple devices or components that can be coupled together. In some embodiments, the system 700 may comprise a wearable device configured to obtain in-vivo measurements of fluid osmolarity. In another embodiment, the system 700 may include a non-wearable device including a receptacle or surface configured to hold or retain a fluid 725 in contact with electrodes 722, 732.

The system 700 includes a power supply 710, a voltage generator 720, a current measurement circuit 730, and an output module 740. The voltage generator 720 is coupled to or in communication with at least the electrode 722. The current measurement circuit 730 is coupled to or in communication with at least the electrode 732. In some embodiments, the voltage generator 720 is coupled to or in communication with both the electrode 722 and the electrode 732. In another embodiment, the current measurement circuit 730 is in communication with or coupled to both the electric 722 and the electrode 732. In some embodiments, the electrode 722 may be referred to as a counter electrode, and the electrode 732 may be referred to as a sensing electrode. In some embodiments the electrode 722 may have a larger surface area than the electrode 732. For example, the electrode 722 may be larger than the electrode 732 by at least one order of magnitude, in some embodiments. In an exemplary embodiment, the electrode 722 is approximately forty times larger than the electrode 732. The electrodes 722, 732 are shown in contact with a fluid 725. The fluid 725 may be a biological fluid or bodily fluid, such as tears, sweat, and/or blood the fluid 725 may include one or more solutes, such as electrolytes for example, the fluid 725 may include one or more salts, such as NaCl and/or KCl.

The power supply 710 may be configured to receive electrical power and output one or more operating voltages to the voltage generator 720, the current measurement circuit 730, and or the output module 740. In some embodiments, the power supply 710 may include, or may be coupled to, a battery. In another embodiment, the power supply 710 may include, or may be coupled to, a wireless power transfer device, such as a loop inductor or antenna. In some embodiments, the power supply 710 is configured to convert alternating current (AC) to direct-current (DC). Accordingly, the power supply 710 may include a rectifier circuit.

The voltage generator 720 is coupled to the power supply 710 and is configured to output, to at least the electrode 722, a voltage for osmolarity sensing. The voltage generator 720 may be configured to output a constant voltage signal for one or more periods of time. For example, the voltage generator 720 may be configured to output an amperometry waveform, such as the waveform 500*a* shown in FIG. 5A. In other embodiments, the voltage generator 720 may be configured to output other patterns or waveforms, such as the waveforms 500*b*-500*e* shown in FIGS. 5B-5E. The voltage generator 720 may include a plurality of analog and/or digital components to produce the voltage waveform. For example, the voltage generator 720 may include one or more capacitors, resistors, transistors, diodes, amplifiers, inductors, and/or any other suitable electronic component to produce a desired voltage waveform. In some embodiments, the voltage generator 720 is configurable to select different waveforms, or to adjust one or more parameters of the waveforms (e.g., amplitude, step size, step length, ramp rate, minimum voltage, maximum voltage, duration, etc.). Accordingly, the voltage generator 720 may be in communication with a processor and/or a user input device. In some embodiments, the voltage generator 720 is configured to receive feedback from the output module 740, and adjust the waveforms and/or parameters of the waveforms based on the feedback.

As explained above, the voltage provided by the voltage generator 720 may be at least partially within an electrochemical active range of the material of the electrode 722 when the electrode 722 is in contact with the fluid 725. For example, the electrode 722 may include gold, and the voltage generated by the voltage generator 720 may be within an active range or region for gold in the presence of a solute in the fluid (e.g., body salts). In some embodiments, the voltage generated by the voltage generator 720 may be between 0.5 v and 1.5 v. By generating the voltage, the voltage generator 720 may cause at least a portion of the electrode 722 two react with the solute in the fluid 725. For example, the voltage from the voltage generator 720 may induce an electrochemical reaction between the gold of the electrode 722 and chlorine in the solute, producing $AuCl_x$. The electric charge transfer resulting from the electrochemical reaction may generate a response current for the electrode 732.

The current measurement circuit 730 is in communication with or coupled to at least the electrode 732. The current measurement circuit 730 configured to obtain current measurements, and transmit the current measurements to the output module 740. The current measurement circuit 730 is configured to determine or measure a current between the electrode 722 and the electrode 732. In particular, the current measurement circuit 730 is configured to obtain a plurality of current measurements over a period of time, and output the current measurements to the output module 740. The measured current may be associated with the concentration of reacted or dissolved electrode material in the fluid 725. In this regard, the charge transfer occurring based on the electrochemical reaction described above may cause a response current detectable by the electrode 732. The response current may decline as the available solute reacts with the electrode material, which may slow down the electrochemical reaction, and therefore the response current.

The output module 740 is configured to output a signal indicating at least one of a current measurement, a charge transfer, and/or an osmolarity of the fluid. For example, in some aspects, the output module 740 includes a memory device configured to store one or more current measurements and/or charge transfer measurements. For example, the memory device may include a buffer configured to store a number of current measurements and/or charge transfer measurements for transmission to a user interface device. In some embodiments, the output module 740 comprises a processor configured to determine an osmolarity of the fluid 725 based on the current measurements and/or the charge transfer measurements, and to output a signal representative of the osmolarity to a user interface device (e.g., smartphone, tablet, mobile computer, hand-held computing device, etc.). In some embodiments, the output module 740 is configured to transmit the data wirelessly, using, for example, Bluetooth®, near-field communication (NFC), ultra-wideband communication (UWB), Wi-Fi, and/or any other suitable wireless communication protocol. In this regard, in some aspects, the output module 740 may include a wireless transceiver including a modem and/or one or more antenna elements. In other embodiments, the output module 740 comprises a wired connection (e.g., universal serial bus (USB), ethernet, fiber optic connection, internal bus, etc.). The signals or data output by the output module 740 may be in a format that is readable by a processor of a user interface device. The user interface device may include a display (e.g., LCD screen, LED screen, touch screen display), a speaker, one or more indicator lights (e.g., LED bulbs), and/or any other indicator component. The user interface device may be configured to indicate, to the user, an osmolarity of the fluid and/or a physiological state associated with the osmolarity. For example, the user interface device may be configured to indicate whether the patient has a healthy eye, mild dry eye, moderate dry eye, severe dry eye, fully hydrated, moderately dehydrated, severely dehydrated, etc.

In some embodiments, the system 700 may be integral with the user interface device. In this regard, the system 700 may include at least one of the indicator components (e.g., display, speaker) described above. The system 700 may further include one or more user input components (e.g., buttons, touch screen display, dials, microphone) configured to receive user inputs for controlling one or more aspects of the osmolarity sensing procedure. For example, the user input components may be used to initiate, pause, and/or cancel an osmolarity sensing procedure. Further, the user input components may be used to control one or more aspects of the osmolarity sensing procedure, such as the voltage, duration, waveform type, and/or any other suitable parameter of the osmolarity sensing procedure.

Figure 8:
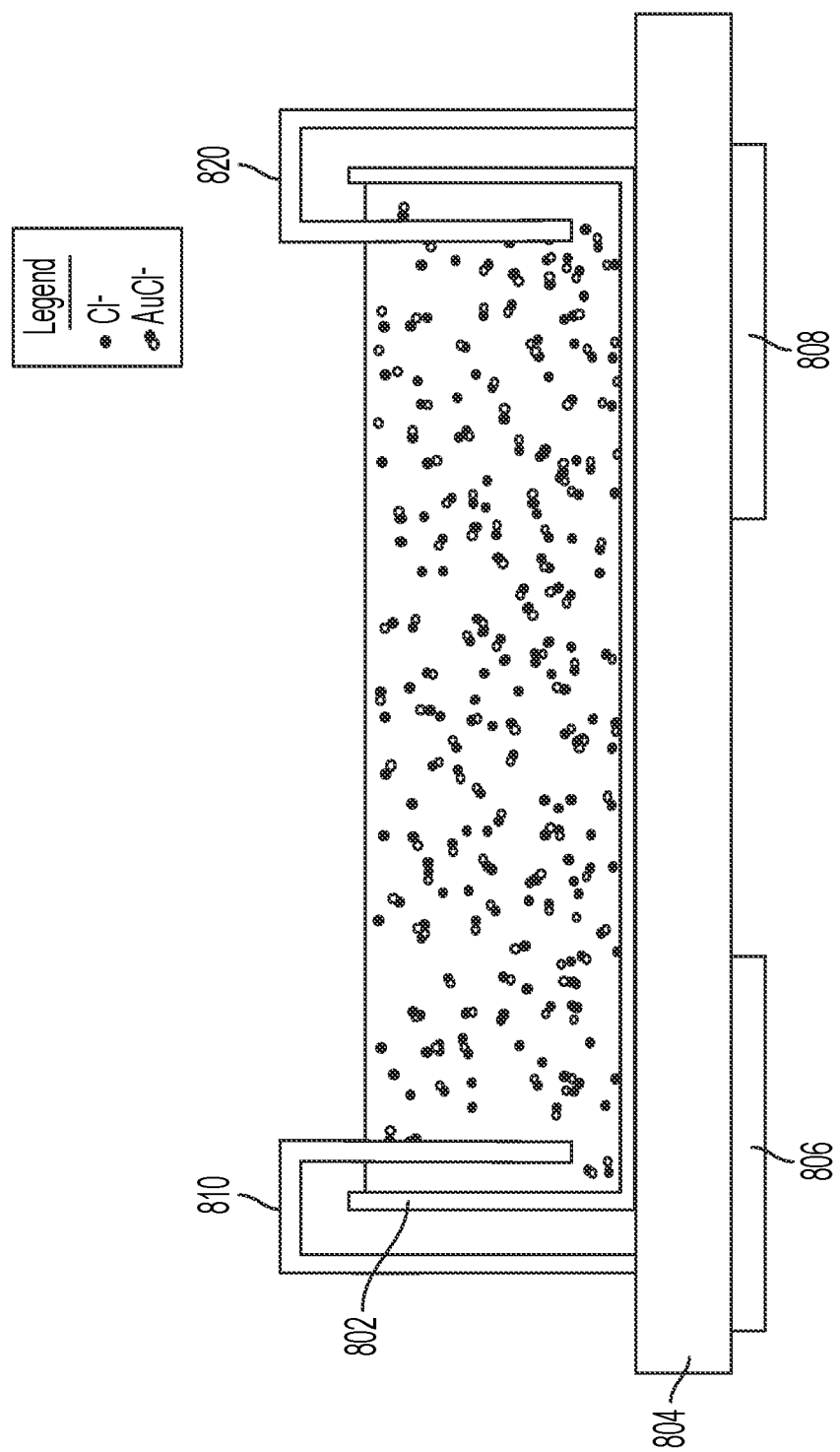
FIG. 8 is a cross-sectional view of an ex vivo osmolarity sensing device, according to some aspects of the present disclosure.

FIG. 8 is a cross-sectional view of a fluid osmolarity sensing device 800 according to an embodiment of the present disclosure. The device 800 may be described as an external fluid osmolarity sensing device, or an ex-vivo osmolarity sensing device. In other words, the device 800 may be suited for use externally from the patient, such that a fluid is brought into contact with the device 800.

The device 800 includes a receptacle 802 configured to retain a fluid carrying a solute (Cl⁻), with the receptacle 802 coupled to a substrate 804. The device 800 further includes a first electrode 810 and a second electrode 820 coupled to the substrate 804. In some aspects, the first electrode 810 and the second electrode 820 may be surface mount components mounted to the substrate.

The device 800 further includes an integrated circuit 806 and a communication chip 808. Some aspects, the integrated circuit 806 may include a voltage generator circuit and a current measurement circuit as similarly described above with respect to FIG. 7. In some aspects, the integrated circuit 806 includes an application-specific integrated circuit (ASIC) configured to obtain current measurements, and to determine a charge transfer and/or an osmolarity of the fluid in the receptacle 802. The integrated circuit 806 may be configured to generate voltages based on the voltage waveforms 500a-500e described above, for example. Accordingly, the integrated circuit 806 may be configured to apply a voltage, via one of the first electrode 810 or the second electrode 820, to the fluid within an active region of the material of the first electrode 810 and/or the second electrode 820. Further, the integrated circuit 806 may be configured to measure the current based on the waveform signal and the induced response current from the electrochemical reaction occurring between the electrode and the solute in the fluid. In some embodiments, the integrated circuit 806 is further configured to determine an osmolarity of the fluid based on the charge transfer. In a further embodiment, the integrated circuit 806 may be configured to determine a physiological state, such as a level of dry eye or a level of dehydration, based on the osmolarity.

The integrated circuit 806 is further configured to output an indication (e.g., a signal, data) of the current measurements, the charge transfer measurements, and/or the osmolarity to the communication chip 808. In some aspects, the communication chip 808 includes an output module, as similarly described above with respect to FIG. 7. In other aspects, the communication chip 808 may be configured to communicate with an external user interface device using Bluetooth®, Wi-Fi, UWB, NFC, and/or any other suitable communication protocol.

It will be understood that one or more aspects of the device 800 may be changed or adjusted without departing from the scope of the present disclosure. For example, the electrodes 810, 820 may be shaped and arranged similar to the osmolarity sensing electrodes 210, 220 of the device 200, or the electrodes 332, 334 of the device 300. In some aspects, the device 800 may not include the receptacle 802. For example, in some aspects, the device 800 may include a flat surface on which the electrodes 810, 820 are disposed. The flat surface may be configured to receive one or more drops of a fluid (e.g., tears, sweat). The device 800 may be configured for benchtop use in a plug-and-play configuration with a computing device (e.g., laptop computer, desktop computer).

A method for determining an osmolarity of a fluid, according to some embodiments of the present disclosure. May be performed using the systems, devices, and procedures described above with respect to FIGS. 1-8. The method may be used to determine the osmolarity of a biological fluid in some aspects. For example, the method may be used to determine the osmolarity of tears and/or sweat. Further, the method may be used to determine a physiological state or condition of a patient, such as a dry eye condition and/or a dehydration condition. The method may be performed using one or more in vivo or wearable devices. In other embodiments, the method may be performed using one or more external, or ex vivo devices.

In the method, an osmolarity sensing device applies a first voltage between a first electrode and a second electrode. The first voltage is in an electrochemical active range for a conductive material of at least one of the first electrode or the second electrode. For example, the first voltage may be applied to a first electrode, where the first electrode may be referred to as a counter electrode. The first electrode may include gold, for example. However, in other embodiments the first electrode and/or the second electrode may include other conductive materials, such as silver, platinum, and/or alloys thereof. The first voltage may be in an electrochemical active range for gold in the presence of a solute or electrolyte in the fluid. Accordingly, the first voltage may cause a portion of the conductive material of at least one of the first electrode of the second electrode to react with the solute and dissolved into the fluid. For example, the solute may include NaCl and/or KCl. The electrochemical reaction may result in the formation of $AuCl_x$, which may then be dissolved into the fluid, and may produce a response current between the first electrode and the second electrode.

The osmolarity sensing device measures, based on the first voltage, an electrical current flowing through the fluid with the dissolved conductive material. In some aspects, this step includes obtaining a plurality of current measurements over a period of time. For example, this step may include obtaining a plurality of current measurements over all or a portion of the time period in which the first voltage is applied. In other embodiments, this step includes measuring a charge transfer occurring over a period of time.

The osmolarity sensing device determines, based on the measured current, the osmolarity of the fluid. In some aspects, this step includes determining, based on a plurality of current measurements, a charge transfer over the time period, and determining the osmolarity of the fluid based on the charge transfer. In some aspects, the osmolarity of the fluid may be proportional to the charge transfer. For example, the osmolarity of the fluid may be determined based on a multiplication of the charge transfer and a conversion coefficient. In some aspects, the conversion coefficient may be based on the type of fluid. For example, the osmolarity sensing device may be configured with a first conversion coefficient to determine tear osmolarity, and a second conversion coefficient to determine sweat osmolarity. In some aspects, the conversion coefficient may be stored in a memory of the osmolarity sensing device.

In some aspects, the actions of this step may be performed by a processor disposed on a wearable device. In other embodiments, the actions of this step may be performed externally or remotely of a wearable device. For example, in some embodiments, the osmolarity sensing device may be configured to communicate the current measurements to a processor of a user interface device, and the user interface device may determine the osmolarity of the fluid. In some embodiments, the user interface device may include a smartphone, tablet, mobile computing device, or any other suitable user interface device. In some embodiments, the osmolarity sensing device comprises an ex vivo sensing device including the electrodes, voltage generator circuitry, current measuring circuitry, and processing circuitry.

The osmolarity sensing device outputs, to a user interface device, an indication associated with the osmolarity. For example, in some aspects, the indication associated with the osmolarity may include a numerical value of the osmolarity. In some embodiments, the indication may be in arbitrary units. In other embodiments, the indication may correspond to concentration measurements measured in mg/L, for example. In some embodiments, the indication associated with the osmolarity includes an indication of a physiological state or condition of a patient. For example, the indication associated with the osmolarity may include an indication of healthy eye, mild dry eye, moderate dry eye, severe dry eye, fully hydrated, mildly dehydrated, moderately dehydrated, severely dehydrated, and/or any other suitable physiological state were condition. The indication of the physiological state or condition of the patient may be determined based on a range of the osmolarity. For example, in some embodiments, an osmolarity ranging below 150 mmol/L may indicate a healthy eye. In some embodiments, an osmolarity ranging from 150 mmol/L to 165 mmol/L may indicate mild dry eye. In some embodiments, an osmolarity ranging from 165 mmol/L to 175 mmol/L may indicate moderate dry eye. In some embodiments, an osmolarity above 15000 mg/L may indicate severe dry eye.

In some aspects, this step may include outputting the indication via a wireless connection. For example, this step may include transmitting a wireless signal indicating an osmolarity measurement and/or a physiological condition. In another example, this step may include transmitting the indication via a wired connection. In some aspects, this step includes outputting a visual indication, such as a numerical value on a screen or display. In another example, this step includes outputting an auditory indication to a speaker, such as an audible tone or dictation of the osmolarity.

Persons skilled in the art will recognize that the devices, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A wearable device for monitoring fluid production, the device comprising:
   a substrate configured to be positioned in the presence of a fluid;
   a first electrode comprising a conductive film disposed on the substrate;
   a second electrode comprising the conductive film disposed on the substrate and spaced from the first electrode; and
   a current measurement circuit configured to:
      apply a voltage between the first electrode and the second electrode, wherein the voltage is in an electrochemical active range of the conductive film such that a portion of the conductive film dissolves into the fluid; and
      transmit, to a processor, a signal indicating a current measurement of an electrical current flowing through the fluid including the dissolved portion of the conductive film.

2. The wearable device of claim 1, wherein a surface area of the second electrode is larger than a surface area of the first electrode.

3. The wearable device of claim 2, wherein the surface area of the second electrode is at least one order of magnitude larger than the surface area of the first electrode.

4. The wearable device of claim 2, wherein the second electrode at least partially surrounds the first electrode.

5. The wearable device of claim 1, wherein a distance between the first electrode and the second electrode is less than 1 mm.

6. The wearable device of claim 1, further comprising:
   at least one pulsing electrode disposed on the substrate; and
   a pulsing circuit coupled to the at least one pulsing electrode and configured to induce an electrical pulse in the patient's tissue via the at least one pulsing electrode.

7. The wearable device of claim 6, wherein the pulsing circuit comprises the processor, the processor in communication with the current measurement circuit, and wherein the pulsing circuit is configured to induce the electrical pulse based on the current measurement.

8. The wearable device of claim 6, wherein the at least one pulsing electrode comprises a first pulsing electrode disposed on the substrate and a second pulsing electrode disposed on the substrate.

9. The wearable device of claim 6, wherein the at least one pulsing electrode comprises a single pulsing electrode, and wherein the pulsing circuit is configured to induce the electrical pulse between the single pulsing electrode and one of the first electrode or the second electrode.

10. The wearable device of claim 1, further comprising a battery disposed on the substrate and a controller disposed on the substrate and configured to receive electrical power from the battery, wherein the controller is configured to apply the voltage between the first electrode and the second electrode.

11. The wearable device of claim 1, further comprising the processor, wherein the processor is configured to:
   determine a fluid osmolarity based on the current measurement; and
   output an indication of fluid osmolarity to a user interface device.

12. The wearable device of claim 11, wherein the fluid osmolarity is a tear osmolarity.

13. The wearable device of claim 11, wherein the fluid osmolarity is a sweat osmolarity.

14. A tear osmolarity sensor, comprising:
a substrate;
a first electrode disposed on the substrate;
a second electrode disposed on the substrate and spaced from the first electrode; and
a current measurement circuit configured to:
apply a voltage to the first electrode, wherein the voltage is in an electrochemical active range for a conductive material of the first electrode such that the first electrode partially dissolves into tear fluid in contact with the first electrode and the second electrode;
obtain a plurality of current measurements over a period of time; and
transmit, to a user interface device based on the plurality of current measurements, a signal associated with a tear osmolarity, the current measurement based on the voltage and representative of an electrical current flowing through the fluid with a dissolved portion of at least one of the first electrode or the second electrode.

15. The tear osmolarity sensor of claim 14, wherein the first electrode and the second electrode comprise gold.

16. The tear osmolarity sensor of claim 14, wherein the first electrode comprises gold, and wherein the second electrode comprises at least one of silver, platinum, iridium, or an alloy thereof.

17. A method for detecting an osmolarity of a fluid, comprising:
applying a first voltage between a first electrode and a second electrode, the first electrode comprising a conductive material, wherein the first voltage is in an electrochemical active range for the conductive material such that a portion of the conductive material dissolves into the fluid;
measuring, based on the first voltage, an electrical current flowing through the fluid with the dissolved conductive material;
determining, based on the measured electrical current, the osmolarity of the fluid; and
outputting, to a user interface device, an indication associated with the osmolarity of the fluid.

18. The method of claim 17, wherein the applying the voltage is based on an amperometry waveform.

19. The method of claim 17, wherein the applying the voltage is based on a linear increase square wave voltammetry waveform.

20. The method of claim 17, wherein the applying the voltage is based on a linear step increase voltammetry waveform.

21. The method of claim 17, wherein the applying the voltage is based on a linear ramp increase voltammetry waveform.

22. The method of claim 17, wherein the applying the voltage is based on a cyclic voltammetry waveform.

23. The method of claim 17, wherein:
the measuring the current comprises obtaining a plurality of current measurements over a time period; and
the determining the osmolarity of the fluid is based on the plurality of current measurements and the time period.

24. The method of claim 17, further comprising:
applying, based on at least one of the measured current or the osmolarity of the fluid, an electrical pulse having a second voltage to a patient's tissue.

25. The method of claim 17, wherein the fluid comprises tear fluid, and wherein the determining the osmolarity of the fluid comprises determining an osmolarity of the tear fluid.

26. The method of claim 17, wherein the fluid comprises sweat, and wherein the determining the osmolarity of the fluid comprises determining an osmolarity of the sweat.

* * * * *